Patented Nov. 4, 1924.

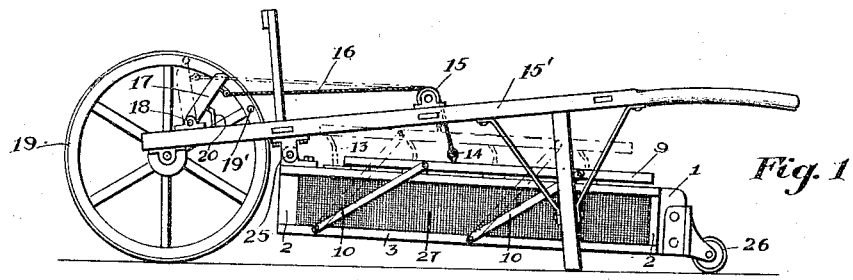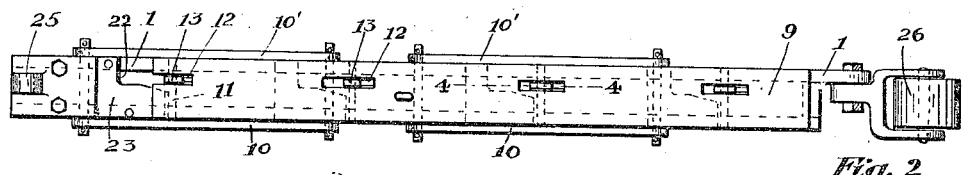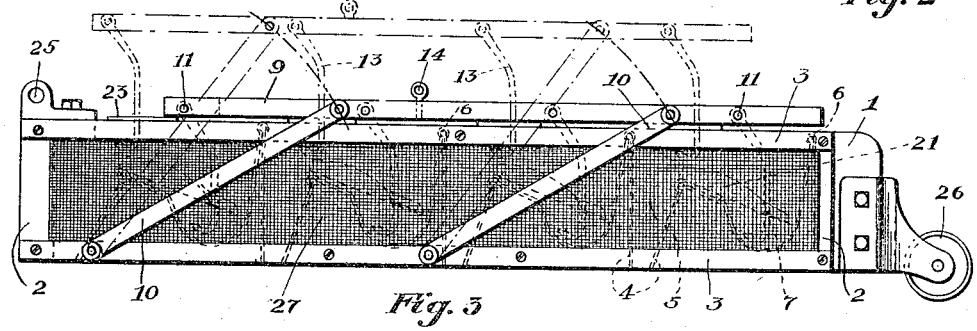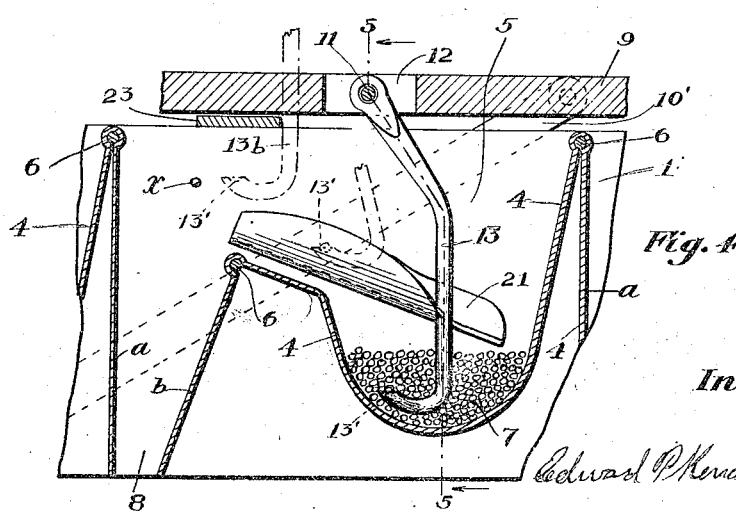

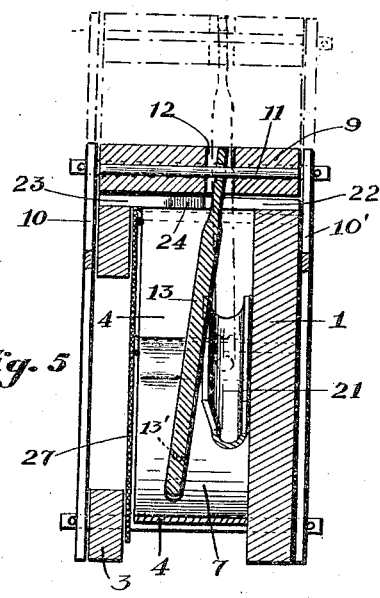
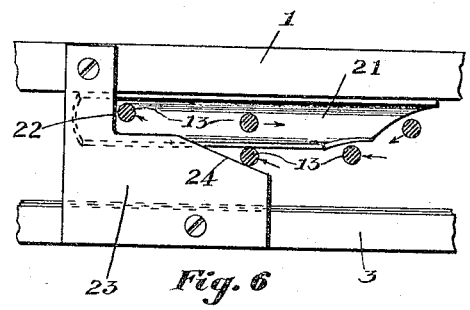
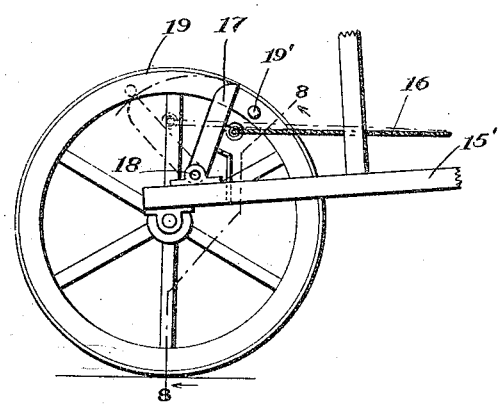
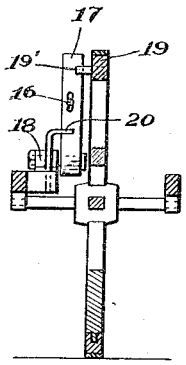

1,514,531

UNITED STATES PATENT OFFICE.

EDWARD P. KENDALL, OF BOWDOINHAM, MAINE.

PLANTER.

Application filed November 8, 1923. Serial No. 673,591.

*To all whom it may concern:*

Be it known that I, EDWARD P. KENDALL, a citizen of the United States, residing at Bowdoinham, in the county of Sagadahoc and State of Maine, have invented new and useful Improvements in Planters, of which the following is a specification.

This invention relates to planting machines and has for its principal object the quick, economical and uniform distribution of various kinds and sizes of seeds which are to be planted in drills or furrows made in the ground.

To attain this and other results I have devised a machine, in the construction of which I have incorporated a feature somewhat resembling one found in a planter, Letters Patent on which I already hold, this feature being a reciprocating seed culling finger, or needle, as I formerly designated it. The patent referred to was issued to me on March 13th, 1923 and numbered 1,448,303.

I have, however, greatly improved the design of this detail of the old machine and besides have embodied in my new invention many new and novel ideas, making it a very simple and portable affair, particularly adapted to the needs of the small farmer, adapted to be actuated by the simplest means and operable by the most unskilled labor. Mounted on an ordinary wheelbarrow, and utilizing the rotary movement of the wheel of same to operate the reciprocating parts, a boy may accomplish more with this planter than many men using the old hand method of planting. I have also had in mind the cost of construction and have therefore eliminated all needless parts and simplified the structure in many particulars, or where I could do so without sacrificing features essential to a perfect working mechanism.

For the purpose of simplifying the illustrations I have shown the planter constructed with a single seed culling finger bar, but it is obvious that a plurality of these bars may be mounted at spaced distances from each other, cross-wise of the planter, and actuated by the same means as is employed where but one bar is used. Also, that as many fingers as is consistent with good practice may be mounted on each bar.

The invention thus set forth in general terms is illustrated in the accompanying drawings, in which, Fig. 1 is a view of the planter mounted in operable position on a wheel-barrow; Fig. 2 is a plan, and Fig. 3 a side elevation of the planter; Fig. 4 is a longitudinal sectional elevation through one of the seed receptacles showing a seed culling finger immersed in a quantity of seed, the section being taken on line 4—4, Fig. 2; Fig. 5 is a cross sectional elevation of the planter, taken on line 5—5, Fig. 4; Fig. 6 is a fragmentary plan view of the deflector plate and trough, and shows the different positions assumed by the seed culling finger in its progressive movements; Fig. 7 a side elevation of the actuating means and Fig. 8 a sectional view of same taken on line 8—8, Fig. 7.

Similar numerals refer to similar parts throughout the different views of the drawings.

In Figs. 2 and 3, I illustrate the plan view and side elevation, respectively, of my planter. 1 represents the back-board, 2—2 the end pieces and 3—3 the front strips, all rigidly secured together to make a box with open top, bottom and front. Within this space and extending from front to back are a multiplicity of irregular shaped thin partitions 4—4, forming separate compartments 5—5. Screws 6, 6 secure these partitions to the back-board.

Each partition rises perpendicularly from the bottom of the compartment to the top of same, descends to the bottom again forming a semi-circular seed receptacle 7. rises again to a spaced distance from the top, inclining somewhat from the semi-circular portion upward, and then descends on an incline to the bottom,—the perpendicular part *a*, and the inclining portion *b* forming a discharge chute 8 for the seed. Surmounting the whole structure is a seed culling finger carrier 9, practically covering the top opening of the box. Pivotally connected to this carrier and extending downwardly are diagonally disposed links 10, 10, their lower extremities pivoted to the bottom front strip 3. For the purpose of properly balancing this member (9) there are corresponding links 10' on the opposite side of the box.

At spaced intervals along the length of the finger carrier 9 and pivoted over pins 11, 11 within the slots 12, 12, are seed culling fingers, 13, 13, with their lower ends bent into a partial U form, terminating in a flattened portion wherein is made a depression 13', the size of which being determined by the size of the seed being culled.

As will be noticed by observing Fig. 4 this finger has an offset portion inclining toward the pivot. Thus when suspended from this pivot freely, the weight of the lower portion will tend to swing the seed culling end forward of a vertical line through the pivot. The purposes of this design of construction are two fold, first to assist the finger to enter the seed freely,—the second to be hereinafter explained.

At 14 is a screw-eye and attached to which and operating over the pulley 15 which is mounted on the floor of a wheel-barrow 15', (see Fig. 1) is a cord 16. The opposite end of this cord is attached to the free end of a swinging lever 17, the latter pivoted at its lower end on a bearing 18. Fixed in the wheel 19, of the wheel-barrow, and adapted to engage intermittently the swinging lever 17 during the rotatable movement of said wheel, is a pin 19'. A stop 20 restricts the backward movement of the swinging lever 17.

In operation, the wheel-barrow being moved forwardly, the pin 19' engages the swinging lever 17, drawing the cord 16 toward the wheel. This lifts the finger carrier 9 from a position shown in full to the position shown in dot and dash lines, Fig. 3, raising all the seed culling fingers from their lowermost to their uppermost positions. When the pin 19' reaches the end of the lever 17 it will slide off and allow the lever to return to the stop 20 and the fingers to fall into the seed receptacles.

At the start of this movement upward the finger, as seen in Fig. 4, is embedded in the seed in the seed receptacle. During its upward course it culls a seed in the pocket or depression 13' on its off-set lower end, continues to rise and at the same time drags along the surface of the partition 4, meanwhile abutting on the side of the trough 21 which deflects it from a perpendicular, as viewed in cross-section (see Fig. 5), and finally reaches the position shown in dot and dash lines, 13ᵇ (Fig. 4). In approaching the latter position, which is its highest one, the finger will swing forwardly, as heretofore noted, by reason of the fact that the center of gravity of the finger is located back of a perpendicular line through the point of suspension, and thus when free to hang normally will impinge strongly upon the face 22 of the deflector plate 23, thereby dislodging the seed $x$ from the depression by the force of the impact, the seed subsequently dropping through the discharge chute 8 directly into the drill made in the ground.

In Fig. 6 is shown diagrammatically several different positions of the fingers during one cycle of movement of the machine (fingers shown in section). It will be noticed that in dropping from its uppermost position the finger is guided through the trough 21 and stands nearly perpendicular (in cross-wise view). Reaching the cut-away portion of the trough it falls off and enters the body of seed, but on again rising is deflected by the side of the trough and assumes a slanting pose until it reaches the bevelled portion 24 on the deflector plate 23, from which it is forced over into a position directly over the trough.

Any suitable means may be employed to attach the planter to the wheel-barrow. In my illustration I have shown a pivoted connection at 25, from which the planter may swing freely. At the rearward end of the machine is a small wheel 26 which serves both to support that end of the planter and to act as a drill or furrow coverer. The drill is made by the wheel of the wheel-barrow and its face may be of any suitable shape. I may also, if I deem it necessary, elect to attach small scrapers or shares to the rearward end of the planter, just forward of the small wheel 26, to assist in covering the drills.

I place over the front opening of the box a fine metal gauze 27, which serves to confine the seed in the receptacles, makes the operation of the fingers visible and provides a visible indicator of the quantity of seed in the planter.

As was previously stated this planter may be designed to carry one or more seed culling fingers on each carrier, but as the seeds are dropped in multiples, length-wise of the drills, in the multiple finger carriers the actuating mechanism must be so timed that each consecutive dropping, or each consecutive reciprocation of the carrier, may be accurately spaced from the preceding one. This may be accomplished by making the circumference of the wheel of the wheel-barrow one seed space greater than the distance between the outer or end fingers of the carrier.

Having thus described the essential features of my invention, what I claim and desire to protect by Letters Patent is:

1. In a planter, consisting of a box, a seed receptacle within said box, a reciprocable seed-culling finger carrier, a seed-culling finger pivotally attached thereto, with its free end adapted to swing from said pivot, a discharge chute contiguous to said receptacle, means for actuating said carrier and means for dislodging a seed from said seed-culling finger directly into said discharge chute.

2. In a planter, a rectangular shaped box having an open top, partitions extending cross-wise of the interior of said box and shaped to form alternate semi-circular seed receptacles and discharge chutes, a seed-culling finger carrier, links pivotally connected to said carrier and to said box, providing the means to hold said carrier, at all times, parallel to the top of said box, seed-culling fingers pivotally connected to said carrier and adapted to reciprocate therewith and to extend into said seed receptacles when said carrier is in its lowered position, a deflector trough for the purpose of guiding said fingers upon their return movement to said receptacles and means for actuating said carrier.

3. In a planter, consisting of an open top rectangular box, partitions extending across the inside width of said box and shaped to form alternate semi-circular seed receptacles and discharge chutes, a seed-culling finger carrier surmounting said box, links pivotally connecting said carrier and said box and adapted to compel said carrier, in its vertical movement, to remain always in a plane parallel to the top of said box, seed-culling fingers with off-set portions on their lower extremities and depressions made in the top of said off-set parts, pivotally connected to said carriers, the upper portions of said fingers made inclining forwardly, thereby causing said lower off-set portion to swing, when free to do so, ahead of a perpendicular line through the point of suspension, a trough, set at an inclined angle from horizontal and adapted to receive and guide the said fingers in their downward movement to the said receptacles, said troughs to have a portion of the lower and inner side cut away for a spaced distance to provide guiding means for the said fingers and to deflect them away from the said trough on their upward movement, deflector plates with a beveled edge on their rearward end for the purpose of returning said fingers to their normal position over said troughs and having also an abutment shoulder constituting means for dislodging the seed from said fingers by the impact against said shoulder, and means for actuating said carrier.

EDWARD P. KENDALL.